United States Patent
Iwamatsu et al.

(10) Patent No.: US 6,565,932 B2
(45) Date of Patent: May 20, 2003

(54) LIQUID CRYSTAL COMPOSITION AND LIQUID CRYSTAL LIGHT MODULATING DEVICE USING THE LIQUID CRYSTAL COMPOSITION

(75) Inventors: Masako Iwamatsu, Toyonaka (JP); Nobuyuki Kobayashi, Kobe (JP); Hideaki Ueda, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 120 days.

(21) Appl. No.: 09/738,539

(22) Filed: Dec. 15, 2000

(65) Prior Publication Data

US 2001/0004108 A1 Jun. 21, 2001

(30) Foreign Application Priority Data

Dec. 17, 1999 (JP) ............................................. 11-358419

(51) Int. Cl.[7] ........................ C09K 19/36; C09K 19/42; C09K 19/16; G02F 1/1333
(52) U.S. Cl. ........................ 428/1.1; 428/1.3; 428/1.5; 252/299.5; 252/299.6; 252/299.7
(58) Field of Search ........................ 428/1.1, 1.3, 1.5; 252/299.5, 299.6, 299.7; 349/106, 123, 185

(56) References Cited

U.S. PATENT DOCUMENTS 5,380,461 A * 1/1995 Sato et al. ............. 252/299.61
5,731,861 A * 3/1998 Hatano et al. ............. 349/169
6,338,883 B1 * 1/2002 Iwamatsu et al. ............. 428/1.1
6,348,961 B2 * 2/2002 Iwamatsu et al. ........... 349/175

FOREIGN PATENT DOCUMENTS

| JP | 9-176649 | * | 7/1997 |
| JP | 9-208958 | * | 8/1997 |
| JP | 10-245557 | * | 9/1998 |
| JP | 11-049707 A | | 2/1999 |

OTHER PUBLICATIONS

English abstract for JP 09–176649, 19997.*

English abstract for JP 09–208958, 1997.*

English abstract for JP 10–245557, 1998.*

* cited by examiner

Primary Examiner—Shean C. Wu
(74) Attorney, Agent, or Firm—Sidley Austin Brown & Wood LLP

(57) ABSTRACT

A reflective type liquid crystal display which has, between a pair of transparent substrates with electrodes thereon, a nematic liquid crystal composition which exhibits a cholesteric phase at room temperature. The liquid crystal composition contains a nematic liquid crystal mixture containing a liquid crystalline difluorostilbene compound, and a chiral agent. The concentration of the liquid crystalline difluorostilbene compound in the liquid crystal composition is preferably in a range from 5 wt % to 60 wt %.

14 Claims, 5 Drawing Sheets

LIQUID CRYSTAL COMPOSITION AND LIQUID CRYSTAL LIGHT MODULATING DEVICE USING THE LIQUID CRYSTAL COMPOSITION

This application is based on application No. 11-358419 filed in Japan, the contents of which are incorporated by reference.

BACKGROUND OF THE INVENTION

1. Field of the Invention

The present invention relates to a liquid crystal composition and a liquid crystal light modulating device such as a liquid crystal display which uses the liquid crystal composition.

2. Description of Related Art

In recent years, various kinds of reflective type liquid crystal displays which use chiral nematic liquid crystal have been developed. The chiral nematic liquid crystal is prepared by adding a chiral agent to nematic liquid crystal so as to exhibit a cholesteric phase at room temperature. Such a liquid crystal display makes a display by switching the liquid crystal between a planar state (colored state) and a focal-conic state (transparent state) when a pulse signal of a specified voltage is applied to the liquid crystal. The liquid crystal display can be so structured as to keep the colored/transparent states even after stoppage of the application of voltage.

This kind of liquid crystal is expected to be used in a different field from liquid crystal for displaying motion pictures. This kind of liquid crystal is typically used as a substitution for paper on which an image is printed. For example, the liquid crystal can be used for electronic blackboards, bulletin boards, electronic books, decorative panels, etc.

This kind of liquid crystal is desired to have the following characteristics: being driven by a low voltage; displaying an image at high definition with high contrast; having a wide operating temperature range; responding to a low temperature, etc. The liquid crystal is especially desired to be driven by a low voltage, to have a high response speed and to display an image with high contrast. There is, however, a well-known fact that when a chiral agent is added to nematic liquid crystal, the driving voltage becomes higher, and the response speed is lowered. Also, when some measures are taken to improve the liquid crystal in one or some of the above desirable characteristics, the liquid crystal is likely to degrade in other characteristics.

SUMMARY OF THE INVENTION

An object of the present invention is to provide a liquid crystal composition and a liquid crystal light modulating device which can be driven by a low voltage, have a high response speed and displays an image with high contrast.

In order to attain the object, a liquid crystal composition according to the present invention comprises: a nematic liquid crystal mixture which contains a liquid crystalline difluorostilbene compound; and a chiral agent. The liquid crystal composition exhibits a cholesteric phase at room temperature.

When a plurality of voltages of mutually different strengths are applied to such a liquid crystal composition which exhibits a cholesteric phase at room temperature, the liquid crystal composition switches between a state to selectively reflect light of a specified wavelength (selective reflection state) and a state to transmit incident light (transparent state).

Liquid crystalline difluorostilbene compounds generally have low viscosity and high anisotropy of refractive index. Therefore, by containing such a liquid crystalline difluorostilbene compound in such a liquid crystal composition, the viscosity of the liquid crystal composition becomes lower, the response speed of the liquid crystal composition becomes higher, and the driving voltage to drive the liquid crystal composition becomes lower. Also, the contrast which is the ratio of the Y value in the selective reflection state to the Y value in the transparent state becomes higher.

Liquid crystalline difluorostilbene compounds represented by the following formula are usable:

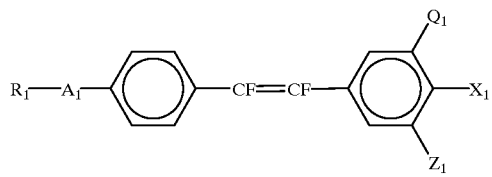

$R_1$: alkyl group with 1 to 10 carbon atoms or alkenyl group with 2 to 20 carbon atoms $A_1$: single bond or 1,4-cyclohexylene group $X_1$: —F, —Cl or —CN $Q_1$: —F or —H $Z_1$: —F or —H The concentration of the liquid crystalline difluorostilbene compound in the liquid crystal composition is preferably in a range from 5 wt % to 60 wt %.

The liquid crystal composition according to the present invention may comprise other liquid crystalline compounds. For example, various kinds of liquid crystalline compounds generally used for nematic liquid crystal, such as liquid crystalline phenylcyclohexane compounds, liquid crystalline tolane compounds, liquid crystalline ester compounds, liquid crystalline pyrimidine compounds, liquid crystalline polycyclic compounds, nonpolar liquid crystalline compounds, etc., may be contained.

Such liquid crystalline difluorostilbene compounds can be produced by a conventional method. For example, the method disclosed by Japanese Patent Laid Open Publication No. 11-49707 can be adopted.

The concentration of the chiral agent in the liquid crystal composition is preferably in a range from 10 wt % to 45 wt %. By setting the concentration of the chiral agent in this range, deposition of crystal can be prevented, and the wavelength of light to be reflected by the liquid crystal composition can be set within a desired wavelength range.

The liquid crystal composition may further comprise a coloring agent. By adding a coloring agent, the color purity of the liquid crystal composition can be adjusted.

A liquid crystal light modulating device according to the present invention comprises: a pair of substrates, at least one of which is transparent; and a liquid crystal layer which is sandwiched between the substrates, the liquid crystal layer comprising the above-described liquid crystal composition. The liquid crystal light modulating device requires a low driving voltage, has a high response speed and can display an image with high contrast.

The liquid crystal layer may have a memory effect. In this case, even after stopping application of a voltage to the light modulating device, the light modulating device can keep displaying an image. Therefore, the liquid crystal modulating device can be used, for example, as an energy-saving display device.

On the substrates, electrodes are formed, and further, an insulating film which function as an alignment controlling layer and/or a color filter may be provided thereon. The insulating film stabilizes the operation of the liquid crystal light modulating device and improves the light modulation performance.

Between the substrates, polymer nodules may be provided. The polymer nodules keep the gap between the substrates more accurately and contributes to achievement of desired light modulation performance.

The substrate which is at a light incidence side may have an ultraviolet-ray absorbing characteristic or an ultraviolet-ray absorbing layer. Also, the other substrate which is opposite the light incidence side may have a light absorbing characteristic or a light absorbing layer.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Embodiments of a liquid crystal composition and a liquid crystal light modulating device according to the present invention are described with reference to the accompanying drawings.

First Embodiment; See FIG. 1

Figure 1:
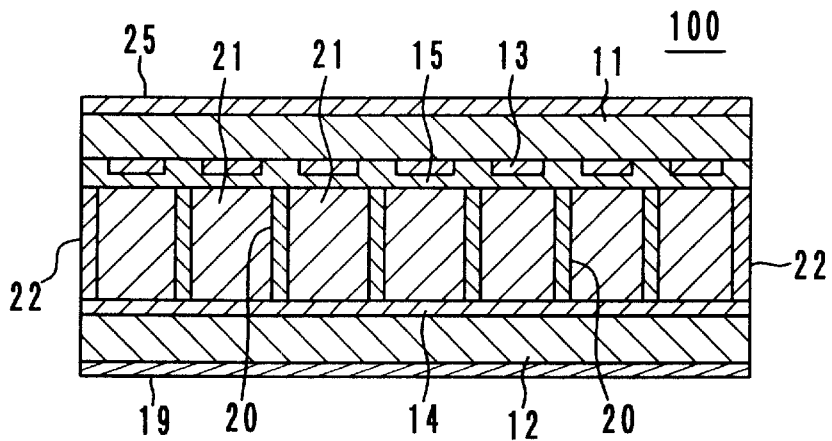
FIG. 1 is a sectional view of a liquid crystal display which is a first embodiment of the present invention.

FIG. 1 is a sectional view of a liquid crystal display 100 which is a first embodiment of the present invention. The numerals 11 and 12 denote transparent substrates of a cell. On the respective surfaces of the substrates 11 and 12, transparent strip-like electrodes 13 and 14 are formed to extend in parallel to one another on the respective surfaces. The transparent electrodes 13 and the transparent electrodes 14 face each other, and the extending direction of the strip-like electrodes 13 and the extending direction of the strip-like electrodes 14 are perpendicular to each other. On the electrodes 13, an insulating layer 15 is coated. The numeral 20 denotes polymer nodules which are to keep a space between the substrates 11 and 12, and the numeral 21 denotes a liquid crystal composition which exhibits a cholesteric phase at room temperature. The materials of these members will be described in detail later in connection with specific examples. The numeral 22 denotes a sealant which is to seal the liquid crystal composition 21 inside the cell. If necessary, a visible-light absorbing layer 19 and an ultraviolet-ray absorbing layer 25 are provided respectively on the lower surface of the substrate 12 and on the upper surface of the substrate 11. Instead of providing the light absorbing layer 19, the substrate 12 may have a visible-light absorbing characteristic.

Structure of Second Embodiment

Figure 2:
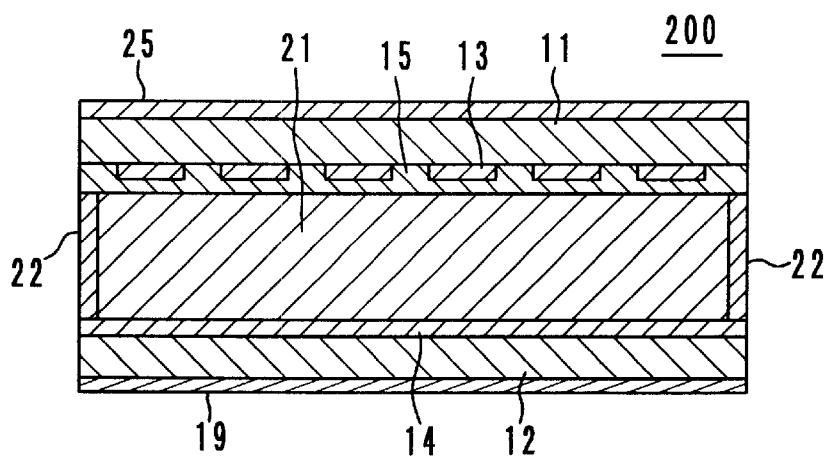
FIG. 2 is a sectional view of a liquid crystal display which is a second embodiment of the present invention.

FIG. 2 is a sectional view of a liquid crystal display 200 which is a second embodiment of the present invention. This liquid crystal display 200 is basically of the same structure as that of the first embodiment shown by FIG. 1. In the second embodiment, however, the polymer nodules are not provided. In FIG. 2, the same parts and members are provided with the same reference symbols as in FIG. 1. The liquid crystal display 200 of the second embodiment have advantages such as having a higher transmittance, being produced by simple processes, etc.

Third Embodiment; See FIG. 3

Figure 3:
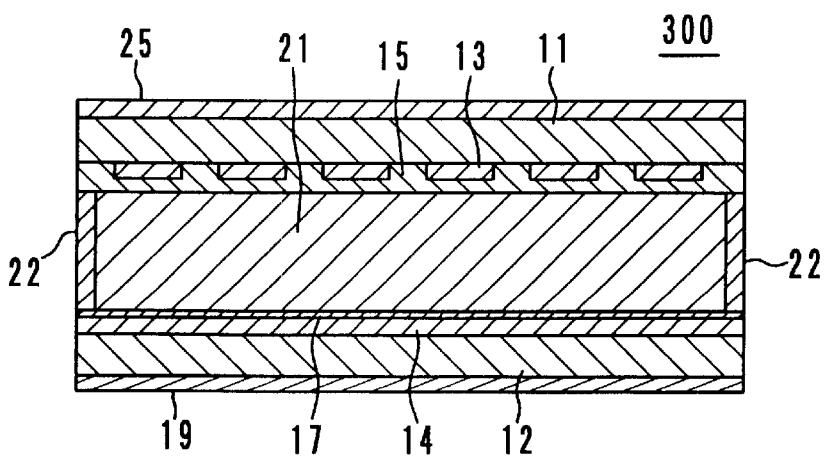
FIG. 3 is a sectional view of a liquid crystal display which is a third embodiment of the present invention.

FIG. 3 is a sectional view of a liquid crystal display 300 which is a third embodiment of the present invention. This liquid crystal display 300 is basically of the same structure as that of the second embodiment with no polymer nodules. In the third embodiment, on the electrodes 14 formed on the substrate 12, an alignment controlling layer 17 is provided. In FIG. 3, the same parts and members are provided with the same reference symbols as in FIG. 2. In the liquid crystal display 300 of the third embodiment, the alignment controlling layer 17 provides the liquid crystal molecules with an anchoring effect. Accordingly, the liquid crystal display 300 is advantageous to that shown by FIG. 2 in the point that changes in characteristics which may occur as time goes by can be prevented.

Fourth Embodiment; See FIG. 4

Figure 4:
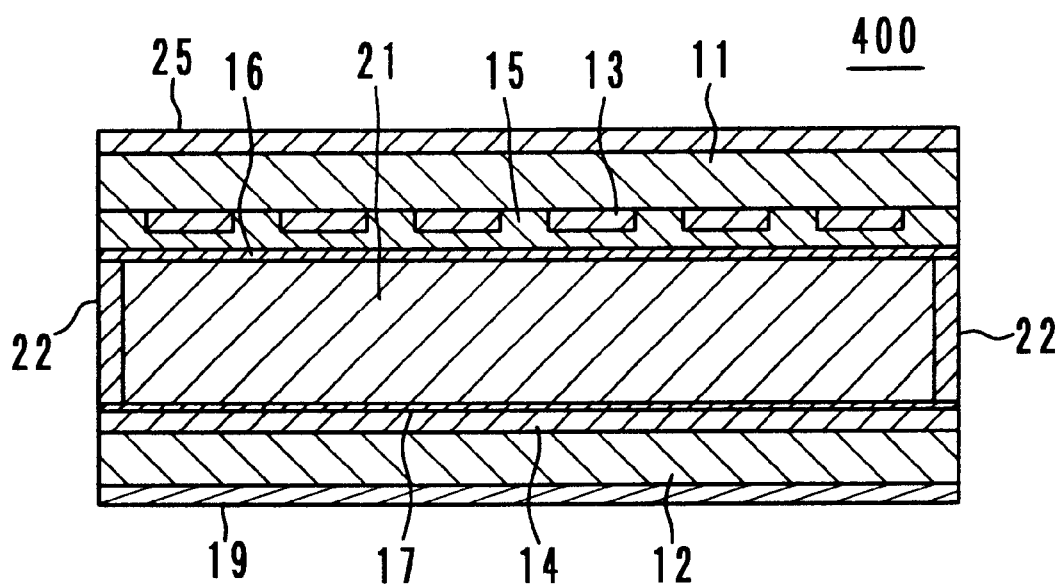
FIG. 4 is a sectional view of a liquid crystal display which is a fourth embodiment of the present invention.

FIG. 4 is a sectional view of a liquid crystal display 400 which is a fourth embodiment of the present invention. This liquid crystal display 400 is basically of the same structure as that of the third embodiment with the alignment controlling layer 17. The liquid crystal display 400 of the fourth embodiment further has an alignment controlling layer 16 on the insulating layer 15 formed on the substrate 11. In FIG. 4, the same parts and members are provided with the same reference symbols as in FIG. 3. The liquid crystal display 400 is advantageous to that shown by FIG. 2 in the point that changes in characteristics which may occur as time goes by can be prevented more effectively.

Fifth Embodiment; See FIG. 5

Figure 5:
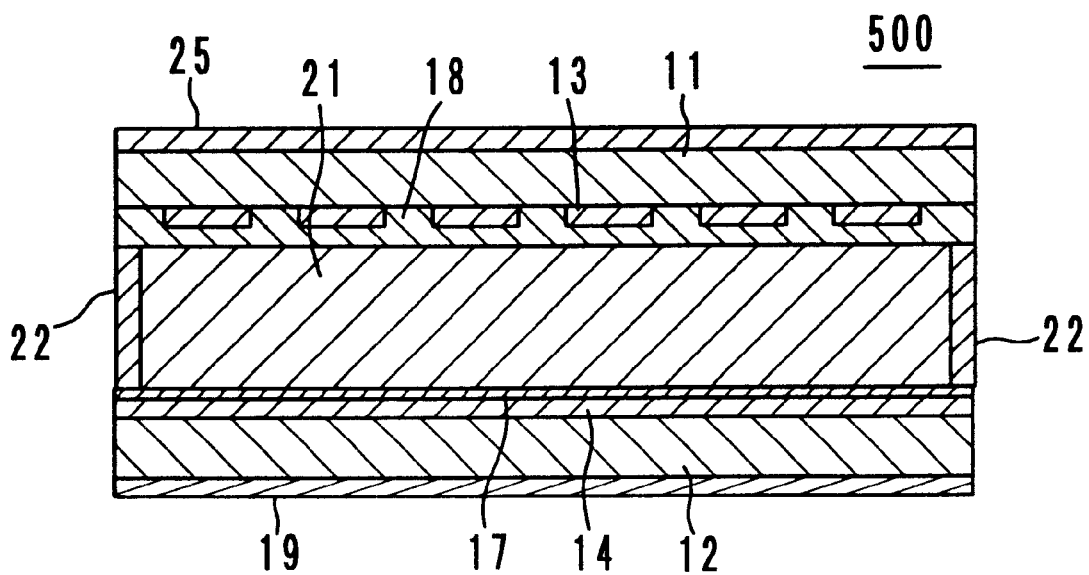
FIG. 5 is a sectional view of a liquid crystal display which is a fifth embodiment of the present invention.

FIG. 5 is a sectional view of a liquid crystal display 500 which is a fifth embodiment of the present invention. This liquid crystal display 500 is basically of the same structure as that of the second embodiment. The liquid crystal display 500 of the fifth embodiment has a color filter 18 on the electrodes 13 formed on the substrate 11. In FIG. 5, the same parts and members are provided with the same reference symbols as in FIG. 2. In the liquid crystal display 500, scattered light component which is other than the light selectively reflected by the liquid crystal in the selective reflection state can be eliminated, and the color purity of the displayed picture can be improved. Accordingly, this liquid crystal display 500 is advantageous to that shown by FIG. 2 in the point that the display performance is higher.

Sixth Embodiment; See FIG. 6

Figure 6:
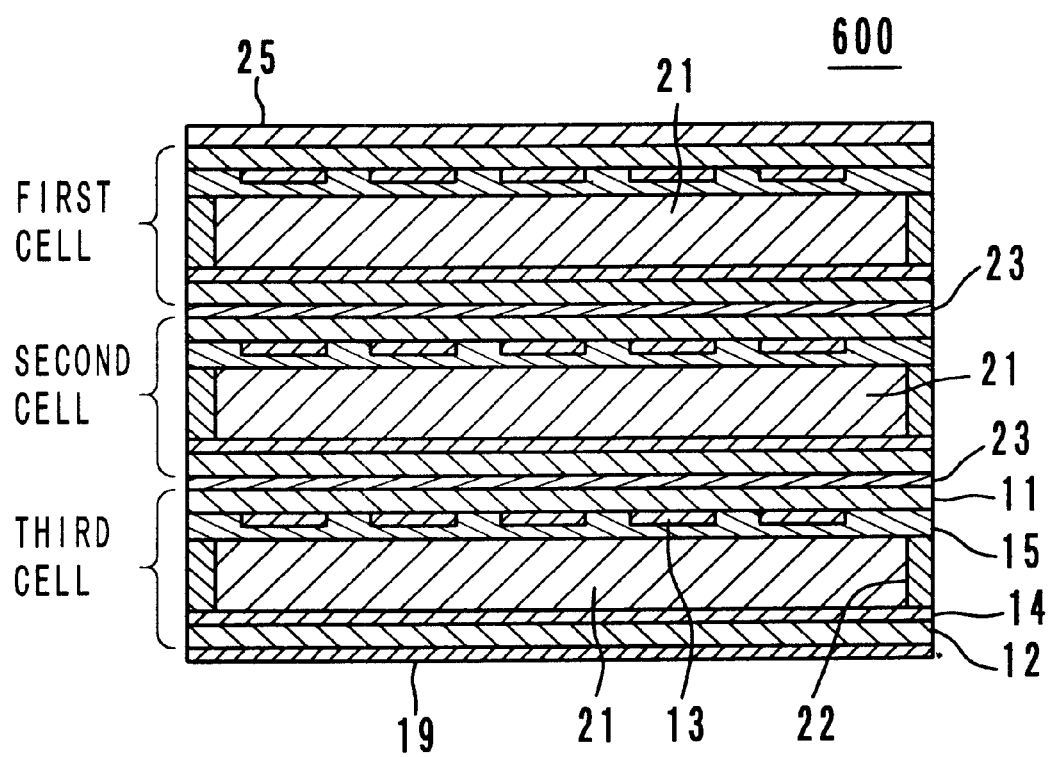
FIG. 6 is a sectional view of a liquid crystal display which is a sixth embodiment of the present invention.

FIG. 6 is a sectional view of a liquid crystal display 600 which is a sixth embodiment of the present invention. This is a full-color reflective type liquid crystal display 600 which has three cells, each of which has a liquid crystal composition 21 which selectively reflects light of a specified wavelength. The respective liquid crystal compositions 21 of the three cells selectively reflect light of mutually different wavelengths. The liquid crystal composition 21 of the first cell (viewing from the observing side) selectively reflects light of around 490 nm (blue); the liquid crystal composition 21 of the second cell selectively reflects light of around 560 nm (green); and the liquid crystal composition of the third cell selectively reflects light of around 680 nm (red). These cells are bonded together by a transparent adhesive 23.

This liquid crystal display 600 switches the liquid crystal compositions 21 of the three cells among a planar state, a focal-conic state and intermediate states between the planar state and the focal-conic state in accordance with RGB color data processed from image data. Thereby, the liquid crystal display 600 makes good full-color display.

Displaying Method

In each of the above-described liquid crystal displays, in order to make a display, a pulse voltage is applied between the electrodes 13 and 14. Since each of the liquid crystal compositions 21 exhibits a cholesteric phase at room temperature, when a pulse voltage of relatively high energy is applied, the liquid crystal comes to a planar state and selectively reflects light of a wavelength which depends on the helical pitch of the liquid crystal molecules and the refractive index. When a pulse voltage of relatively low energy is applied, the liquid crystal comes to a focal-conic state and becomes transparent. Each of the liquid crystal displays can be so structured that the liquid crystal can stay in these states even with no voltage application.

It is known that there is an intermediate state between the focal-conic state and the planar state. By applying a pulse voltage of intermediate energy to the liquid crystal, an intermediate tone can be reproduced on the liquid crystal. It is regarded that in the intermediate state, liquid crystal molecules in the planar state and liquid crystal molecules in the focal-conic state are mixed. Each of the liquid crystal displays can be so structured that the liquid crystal can also stay in the intermediate state even with no voltage application. Further, since the light absorbing layer 19 is provided, the liquid crystal shows black when it is in the focal-conic state.

In each of the liquid crystal displays, the intersections between the strip-like electrodes 13 and 14 function as pixels. In the present specification, the area in which light modulation is performed by the liquid crystal is referred to as a light modulating area. Out of the light modulating area, light modulation is not performed. With respect to the liquid crystal displays, the light modulating area is actually a displaying area.

Substrates

At least one of the substrates 11 and 12 must transmit light. As a transparent substrate, not only glass but also flexible substrates such as polycarbonate, polyether sulfone, polyethylene terephthalate, etc. are usable.

Electrodes

As the electrodes 13 and 14, transparent conductive films of which typical example is ITO (indium tin oxide), metal electrodes such as aluminum, silicon, etc. and photoconductive films such as amorphous silicon, BSO (bismuth silicon oxide), etc. are usable. In order to form the electrodes 13 and 14 into strips, for example, ITO films are formed on the substrates 11 and 12 by sputtering or the like, and thereafter, the films are patterned by photolithography.

Insulating Layer, Alignment Controlling Layer, Color Filter

The insulating layer 15 is an inorganic film such as silicon oxide or the like or an organic film such as polyimide resin, epoxy resin, acrylic resin, urethane resin or the like. The insulating layer 15 prevents a short-circuit between the electrodes 13 and 14 and functions as a gas barrier to improve the reliability of the liquid crystal. Polyimide resin or silicon resin which also function as an alignment controlling layer may be used. Further, by adding a dye to the material, the insulating layer 15 functions also as a color filter. The polymeric material used for the polymer nodules 20 may be also used for the insulating layer 15.

Spacers

Spacers may be provided between the substrates 11 and 12 although they are not shown in FIGS. 1 through 6. For example, particles of resin or inorganic oxide can be used as the spacers, and the spacers keep an even gap between the substrates 11 and 12. It is possible to provide only particle spacers as a space keeper without providing the polymer nodules 20.

Liquid Crystal Composition

As the liquid crystal composition, a chiral nematic liquid crystal composition which is prepared by adding a chiral agent to a nematic liquid crystal mixture containing a liquid crystalline difluorostilbene compound and which exhibits a cholesteric phase at room temperature is used. By changing the concentration of the chiral agent in the liquid crystal composition, the wavelength of light to be selectively reflected by the liquid crystal composition can be adjusted and can be set within the visible spectrum or within the infrared spectrum. Also, it is possible to add other additives such as a coloring agent, an ultraviolet-ray absorbent, etc. to the liquid crystal composition.

The liquid crystal composition may contain other liquid crystalline compounds as well as the liquid crystalline difluorostilbene compound. Any liquid crystal components can be contained in the liquid crystal composition as long as they are stable as nematic liquid crystal. For example, liquid crystalline phenylcyclohexane compounds, liquid crystalline tolan compounds, liquid crystalline ester compounds, liquid crystalline pyrimidine compounds, liquid crystalline polycyclic compounds, nonpolar liquid crystalline compounds, etc. may be contained.

The concentration of the liquid crystalline difluorostilbene compound in the total of nematic liquid crystal components (nematic liquid crystal mixture) is within a range from 10 wt % to 70 wt %, desirably within a range from 20 wt % to 70 wt % and more desirably within a range from 30 wt % to 60 wt %. The concentration of the liquid crystalline difluorostilbene compound in the liquid crystal composition including the chiral agent is within a range from 5 wt % to 60 wt %, desirably within a range from 10 wt % to 60 wt % and more desirably within a range from 15 wt % to 50 wt %.

The liquid crystalline difluorostilbene compound has low viscosity and has high anisotropy of refractive index. Accordingly, the liquid crystalline difluorostilbene compound lowers the viscosity of the liquid crystal composition, which results in lowering the driving voltage of the liquid crystal composition and in improving the response speed of the liquid crystal composition. Further, the liquid crystalline difluorostilbene compound heightens the contrast between the colored state and the transparent state of the liquid crystal composition.

The followings are a general chemical formula (A) and specific chemical formulas (A1) through (A64) of preferred liquid crystalline difluorostilbene compounds. However, these are not all the usable liquid crystalline difluorostilbene compounds.

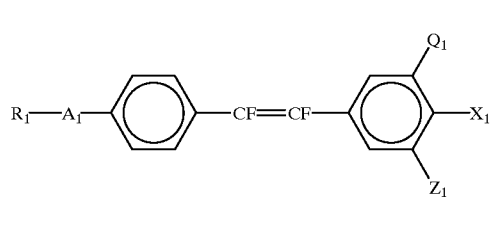
(A)

$R_1$: alkyl group with 1 to 10 carbon atoms or alkenyl group with 2 to 10 carbon atoms
$A_1$: single bond or 1, 4-cyclohexylene group
$X_1$: —F, —Cl or —CN
$Q_1$: —F or —H
$Z_1$: —F or —H

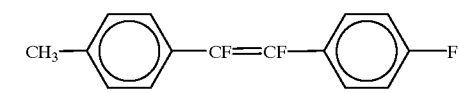
(A1)

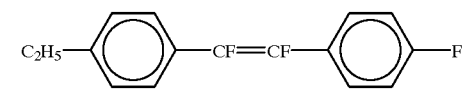
(A2)

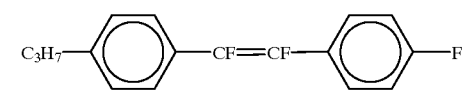
(A3)

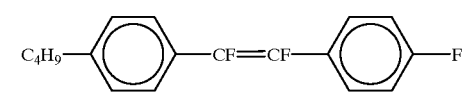
(A4)

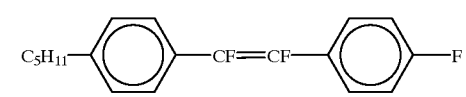
(A5)

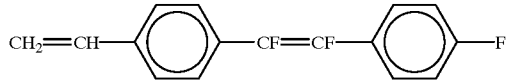
(A6)

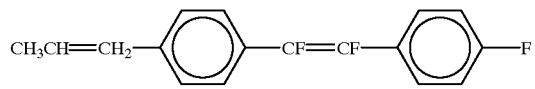
(A7)

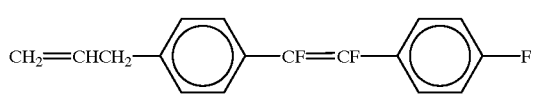
(A8)

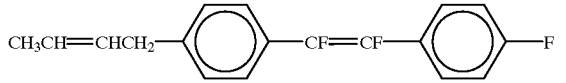
(A9)

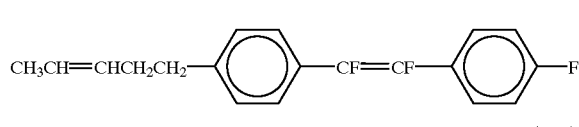
(A10)

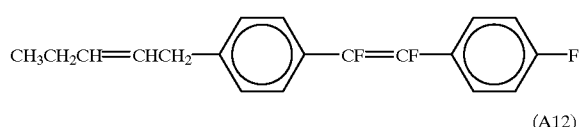
(A11)

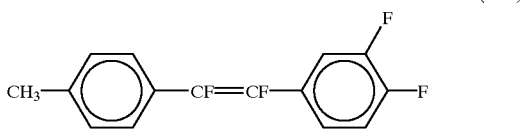
(A12)

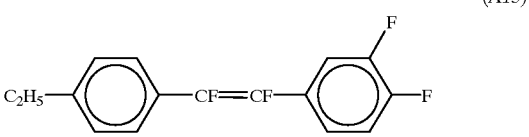
(A13)

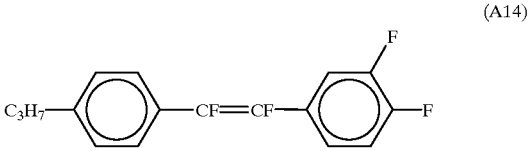
(A14)

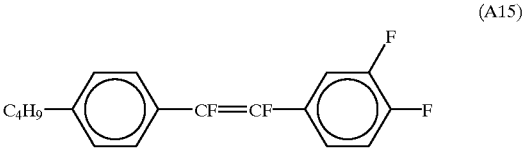
(A15)

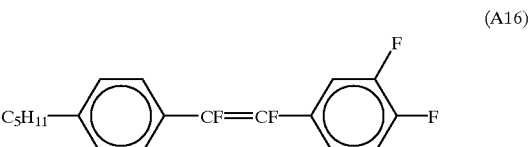
(A16)

(A17)

(A18) 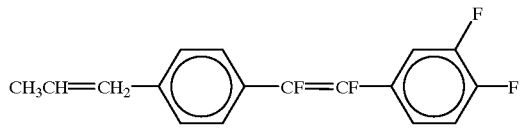
(A19) 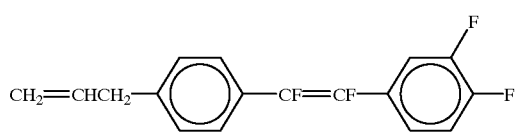
(A20) 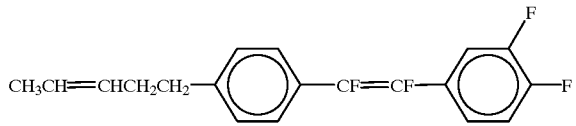
(A21) 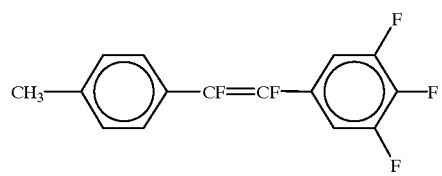
(A22) 
(A23) 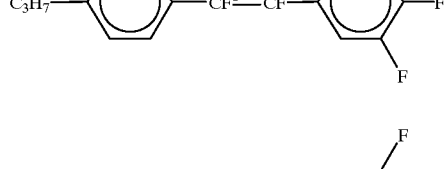
(A24) 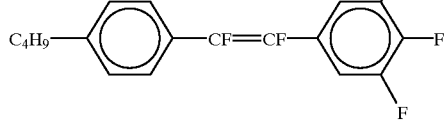
(A25) 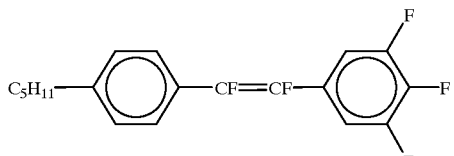
(A26) 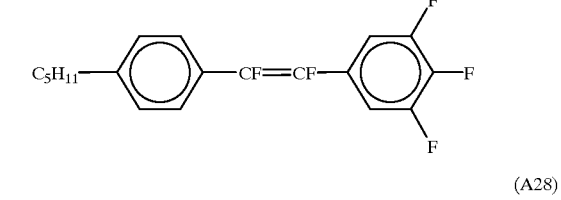
(A27) 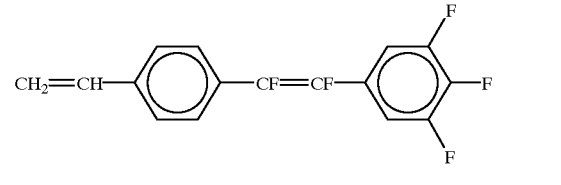
(A28) 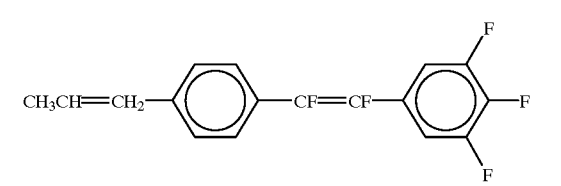
(A29) 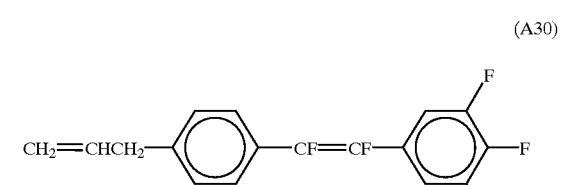
(A30) 
(A31) 
(A32) 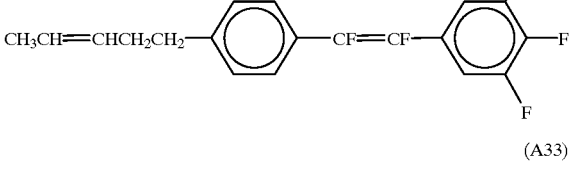
(A33) 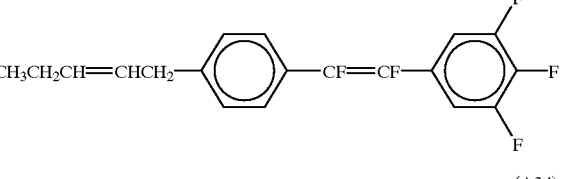
(A34) 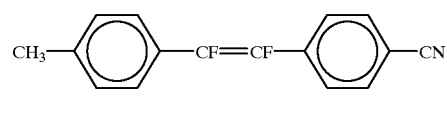

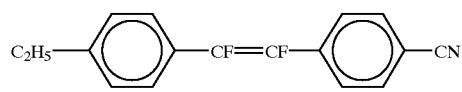
(A35)
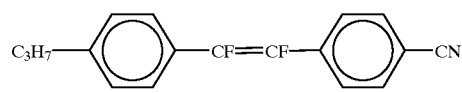
(A36)
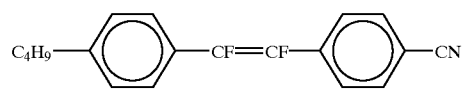
(A37)
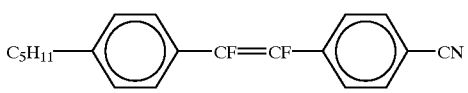
(A38)
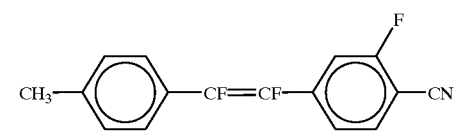
(A39)
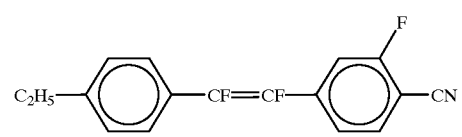
(A40)
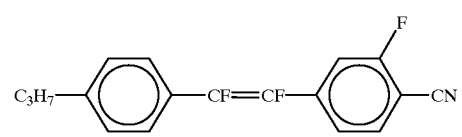
(A41)
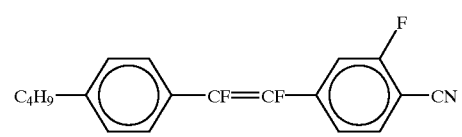
(A42)
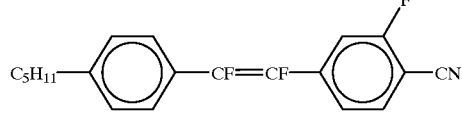
(A43)
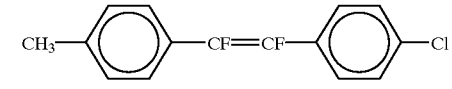
(A44)
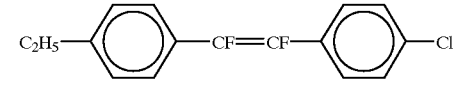
(A45)
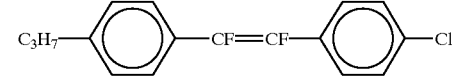
(A46)
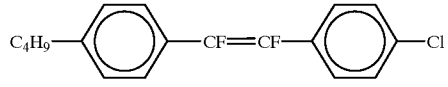
(A47)
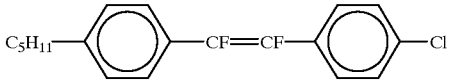
(A48)
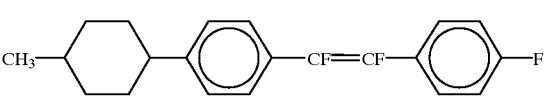
(A49)
(A50)
(A51)
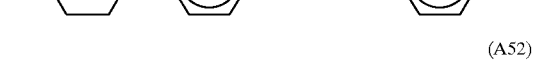
(A52)
(A53)
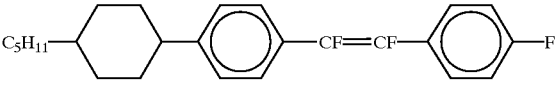
(A54)
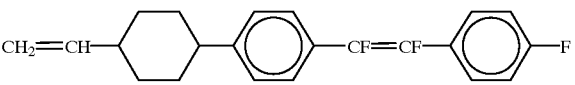
(A55)
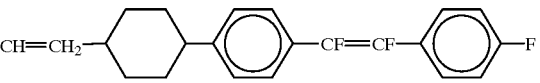
(A56)
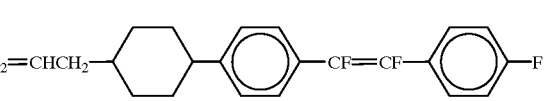
(A57)
(A58)
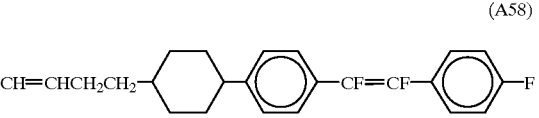

(A59)
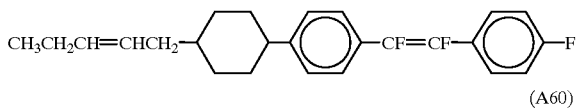

(A60)
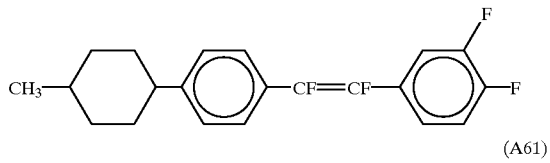

(A61)
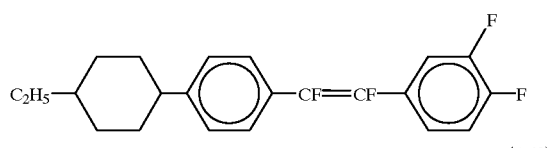

(A62)
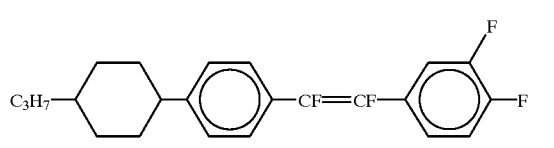

(A63)
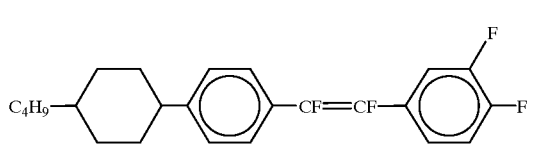

(A64)
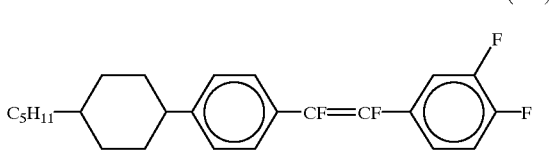

A chiral nematic liquid crystal composition has an advantage that the pitch of the helical structure of the liquid crystal molecules can be changed by changing the concentration of the chiral agent therein, whereby the wavelength of light to be selectively reflected by the liquid crystal composition can be adjusted. Generally, as the term expressing the pitch of the helical structure of liquid crystal molecules, a term "helical pitch" which is defined as the distance between molecules which are located at 360 degrees to each other along the helical structure is used.

A chiral agent is an additive which, when it is added to nematic liquid crystal, twists the molecules of the liquid crystal. When a chiral agent is added to nematic liquid crystal, the liquid crystal molecules form a helical structure with uniform twist intervals, and thereby, the liquid crystal exhibits a cholesteric phase. Using a plurality of chiral agents changes the transition temperature to isotropic phase of the liquid crystal, inhibits the wavelength of light to be selectively reflected by the liquid crystal from changing with changes in temperature, changes the properties of the liquid crystal such as anisotropy of dielectric constant, anisotropy of refractive index, viscosity, etc. and results in an improvement in display performance.

The liquid crystal composition may contain two or more chiral agents. By adding a plurality of chiral agents, a change in wavelength of light to be selectively reflected by the liquid crystal composition with a change in temperature can be prevented. In a case of adding a plurality of chiral agents, two chiral agents which have the same twisting direction (which twist liquid crystal molecules in the same direction) may be included, or two chiral agents which have mutually opposite twisting directions (which twist liquid crystal molecules in mutually opposite directions) may be included. The total concentration of the chiral agents in the liquid crystal composition is desirably within a range from 10 wt % to 45 wt % (more desirably within a range from 15 wt % to 35 wt %). If the total concentration of the chiral agents is over 45 wt % of the liquid crystal composition, there arise problems that a higher driving voltage may be necessary, that crystal may be deposited, etc. If the total concentration of the chiral agents is under 10 wt %, the wavelength of light to be selectively reflected by the liquid crystal composition may not reach the visible spectrum.

The chiral agents are, for example, biphenyl compounds with an optically active group at an end, tarphenyl compounds, ester compounds, etc. which cause nematic liquid crystal to form a helical structure. Also, cholesteric liquid crystal with a cholesterol ring, such as cholesteric nonanoate, can be used as the chiral agents.

The followings are specific examples of the chiral agents.

(B1)
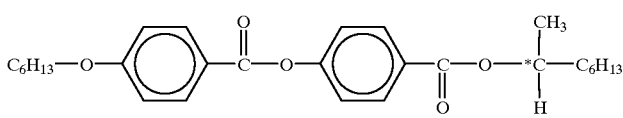

(B2)
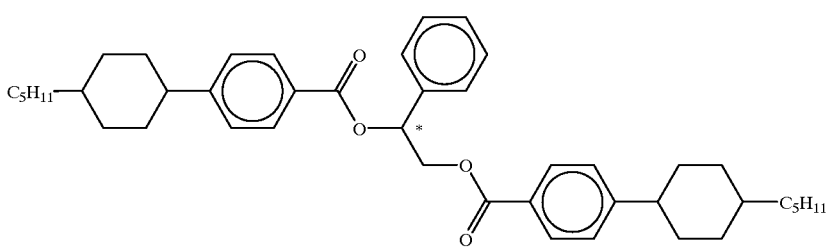

(B3)
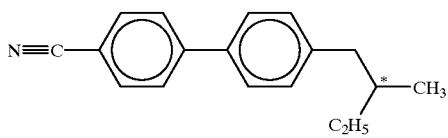

(B4)
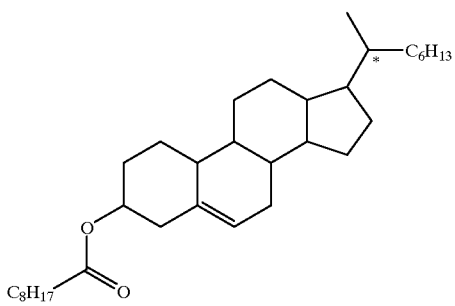

(B5)
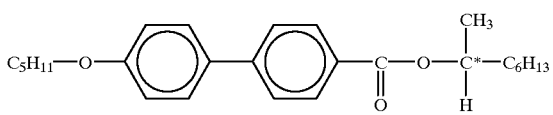

(B6)
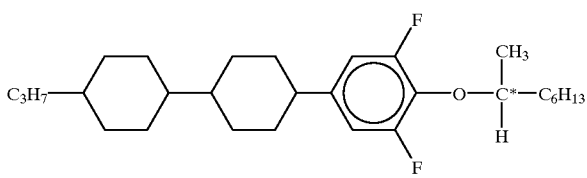

(B7)
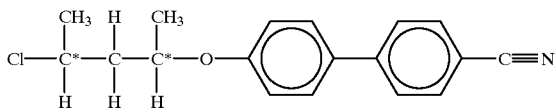

The coloring agent preferably has characteristics of improving the color purity of the image displayed by use of selective reflection of the liquid crystal composition and of absorbing light which may lower the transparency of the liquid crystal composition in the transparent state. Various kinds of well-known coloring agents, for example, azo compounds, quinone compounds, anthraquinone compounds, dichroic dyes, etc. are usable, and two or more of these coloring agents can be used in combination. The concentration of the coloring agents is preferably not more than 3 wt % of the total of the liquid crystal components and the chiral agents.

In a case of using a color filter instead of adding a coloring agent, a material which is prepared by adding a coloring agent to a transparent substance may be used for the color filter. A material which is originally colored or a film of a substance which has the same function as the coloring agent may be used. The same effect can be obtained by replacing the transparent substrates with substrates made of any of the materials usable for the color filter instead of providing the color filter.

Polymer Nodules

The polymer nodules 20 may be of any shape, for example, cylinders, elliptic cylinders or square poles. The polymer nodules 20 may be arranged at random or may be arranged regularly, for example, in a lattice. Providing such polymer nodules results in keeping an even gap between the substrates easily and improving the stability of the focal-conic state and the planar state of the liquid crystal display. If dot type polymer nodules are arranged at regular intervals, the display performance is likely to be even.

The polymer nodules can be formed by a photolithography method following the steps of: coating photosetting resin such as a photoresist of ultraviolet-ray setting monomer on a substrate to a specified thickness; carrying out pattern exposure, for example, by radiating ultraviolet rays to the coated rein via a mask; and removing unhardened parts of the resin.

The polymer nodules also may be made of thermoplastic resin, for example, a resin material which is prepared by dissolving thermoplastic resin in an appropriate solvent. In this case, the following methods can be adopted to form the polymer nodules: a printing method in which the thermoplastic resin is extruded by a squeegee onto a substrate; a dispenser method or an ink-jet method in which resin is ejected from the end of a nozzle onto a substrate; and a transfer method in which resin is supplied on a plate or a roller and thereafter is transferred to a substrate. Then, on the substrate on which the polymer nodules have been formed, another substrate is placed, and the substrates are pressed and heated. In this way, a liquid crystal cell with polymer nodules between substrates can be fabricated.

In order to finish the cell with polymer nodules between substrates into a liquid crystal display, a liquid crystal composition is injected between the substrates by a vacuum injection method. Also, it is possible to fill the liquid crystal composition in the cell simultaneously with lamination of the substrates by dropping the liquid crystal composition on one of the substrates.

Further, in order to regulate the gap between the substrate more accurately, at the time of forming the polymer nodules, spacers, for example, glass fiber, glass balls, ceramic powder or particles of an organic material, which are smaller than the thickness of the resin material of the polymer nodules are arranged on the substrate. Thereby, the gap between the substrates is less likely to change by heat and/or pressure, and voltage unevenness and color unevenness can be suppressed.

Sealant and Others

The sealant 22 is to seal the liquid crystal composition 21 into the substrates 11 and 12. For the sealant 22, thermosetting resin such as epoxy resin, acrylic resin, photosetting adhesives, etc. can be used.

It is well known that liquid crystal generally degrades in characteristics by irradiation of light of shorter wavelengths not more than 380 nm. The degradations in characteristics emerge as display unevenness, lowering of contrast, rising of driving voltage, etc. In order to avoid this trouble, an ultraviolet-ray absorbing layer such as an ultraviolet cutting filter or an ultraviolet cutting resin film may be provided.

Such an ultraviolet-ray absorbing layer may be provided directly on the transparent substrate in the light incidence side (observing side), or a transparent member which has an ultraviolet-ray absorbing layer may be provided on the substrate in the light incidence side. To form the ultraviolet-ray absorbing layer, any method, not a specified method, can be adopted. However, the following methods are typical: a method in which an ultraviolet-ray absorbent is mixed in acrylic resin, in silicone resin or the like, and the mixture is coated and hardened on the substrate; and a method in which a filter with an ultraviolet-ray absorbent added is put in triacetate or the like.

As the ultraviolet-ray absorbent, typically, benzophenone compounds, benzotriazole compounds, etc. are usable; however, other compounds may be used.

EXPERIMENTAL EXAMPLE 1

Nematic liquid crystal ($\Delta n=0.2024$, $\Delta \epsilon=7.2$, $T_{NI}=95°$ C.) of which main constituents are a liquid crystalline tolane compound and a liquid crystalline phenylcyclohexane compound was mixed with the liquid crystalline difluorostilbene compounds indicated by the chemical formulas (A3), (A5) and (A51). The mixing ratio of the nematic liquid crystal to the total of the liquid crystalline difluorostilbene compounds was 7:3 by weight. In this way, a nematic liquid crystal mixture which contains liquid crystalline difluorostilbene compounds at 30 wt % was prepared. The chiral agents indicated by the chemical formulas (B5) and (B2) were mixed with each other at the ratio of 62:38 by weight. This chiral agent mixture was added to the nematic liquid crystal mixture so that the chiral agent would be 21 wt % of the total of the nematic liquid crystal mixture and the chiral agent mixture. Thus, a chiral nematic liquid crystal composition which selectively reflects light of around 680 nm was prepared.

Next, two PES films, each of which has patterned transparent electrodes on one surface, were prepared. On the electrode surface of one of the PES films, a polyimide film AL4552 (made by JSR Co., Ltd.) was formed to have a thickness of 800 Å as an alignment controlling layer, and in this way, a first substrate was prepared. On the alignment controlling layer of the first substrate, spacer particles with a diameter of 7 $\mu$m were dispersed, and XN21S (made by Mitsui Chemical Co., Ltd.) was screen-printed into an endless wall along the sides of the first substrate as a sealant. In the meantime, on the other PES film (second substrate), HIM3000 (made by Hitachi Kasei Co., Ltd.) was formed into a layer with a thickness of 2000 Å as an insulating layer. Further, on the insulating layer, AL4552 (made by JSR Co., Ltd.) was formed into a layer with a thickness of 800 Å as an alignment controlling layer. Neither of the alignment controlling layers on the substrates were subjected to a rubbing treatment.

Next, on the second substrate, a resin material of which main constituent is thermoplastic resin was placed on a metal mask which has a large number of holes with a diameter of approximately 100 $\mu$m at uniform intervals of approximately 500 $\mu$m and was screen printed by use of a squeegee. Thereby, cylindrical polymer nodules with a height of approximately 7 $\mu$ were formed. Then, the liquid crystal composition was coated on the first substrate, and the first substrate and the second substrate were laminated together by use of a laminating device. Thereafter, the laminate of substrates was heated at 150° C. for one hour. Further, a black light absorbing layer was provided on the second substrate, and a red color filter was provided on the first substrate. Thus, a liquid crystal display was fabricated.

Figure 7:
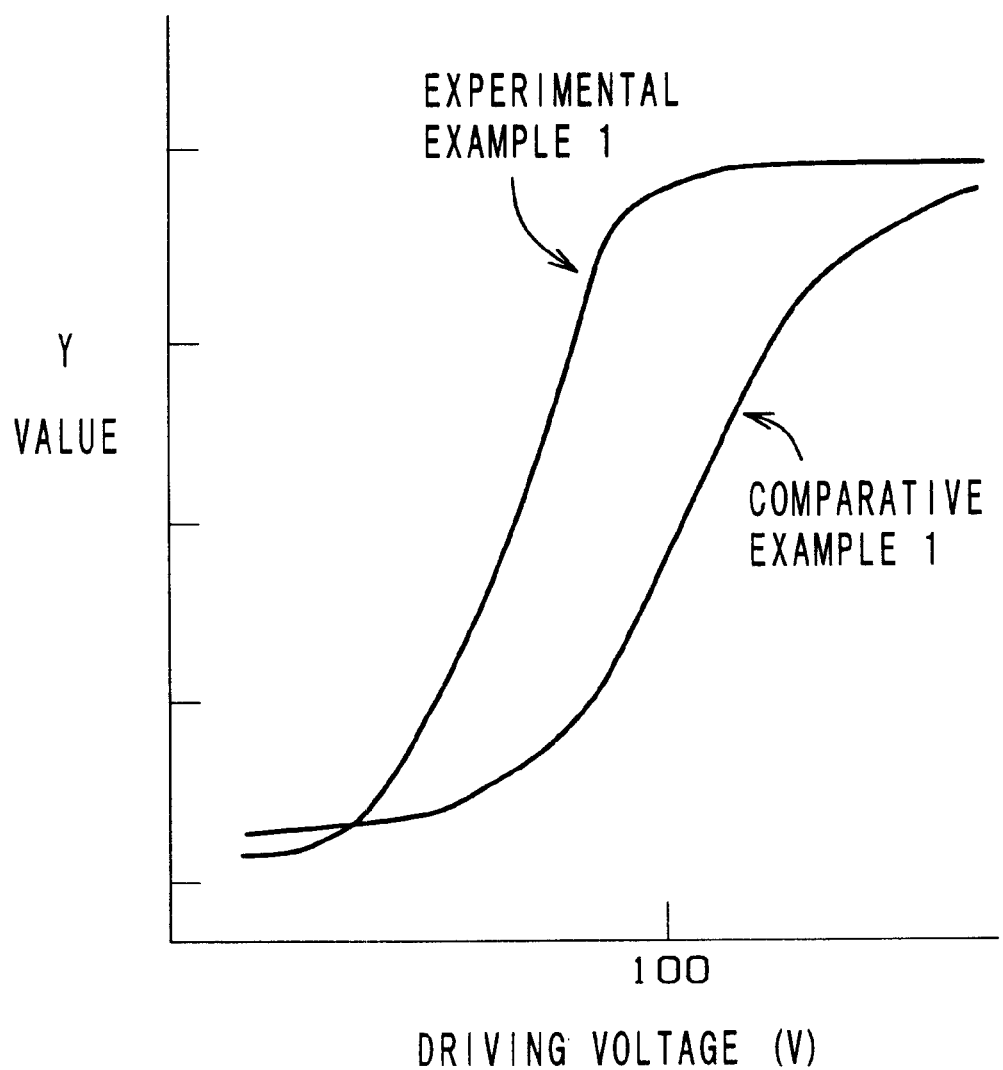
FIG. 7 is a graph which shows characteristics of an experimental example 1 and a comparative example 1 about change in Y value against change in driving voltage.

When a pulse voltage of 50V was applied between the electrodes of the liquid crystal display, the liquid crystal composition became transparent (came to a focal-conic state), and the Y value at that time was 1.1. When a pulse voltage of 80V was applied for 5 msec. thereafter, the liquid crystal composition reflected red light (came to a planar state), and the Y value at that time was 5.25. Accordingly, the contrast was 4.77. The color purity was 83%, and the reflectance was 32%. The characteristic of this liquid crystal display about change in Y value against change in driving voltage with a pulse width of 1 msec. is shown in FIG. 7.

This liquid crystal display was left in a constant temperature bath at 70° C. for 300 hours, and thereafter, the above measurements were carried out. In result, the values hardly changed.

COMPARATIVE EXAMPLE 1

The chiral agent mixture which was used in the experimental example 1 was added to the nematic liquid crystal of which main constituents are a liquid crystalline tolane compound and a liquid crystalline phenylcyclohexane compound which was used in the experimental example 1; however, no liquid crystalline difluorostilbene compounds were mixed with the nematic liquid crystal. The chiral agent mixture was added so as to constitute 22.4 wt % of the total of the nematic liquid crystal and the chiral agent mixture. In this way, a chiral nematic liquid crystal composition which selectively reflects light of around 680 nm and which contains no liquid crystalline difluorostilbene compounds was prepared.

Next, a cell of the same structure as that of the experimental example 1 was fabricated by using the same materials by the same method, and the liquid crystal composition was filled in the cell. Also, as in the experimental example 1, a light absorbing layer and a red color filter were provided. Thus, a liquid crystal display was produced.

When a pulse voltage of 60V was applied between the electrodes of this liquid crystal display for 5 msec., the liquid crystal composition became transparent (came to a focal-conic state), and the Y value at that time was 1.18. When a pulse voltage of 90V was applied for 5 msec. thereafter, the liquid crystal composition reflected red light (came to a planar state), and the Y value at that time was 4.8. The contrast was 4.06. The color purity was 78.5%, and the reflectance was 32%. The characteristic of this liquid crystal display about change in Y value against change in driving voltage with a pulse width of 1 msec. is shown in FIG. 7.

EXPERIMENTAL EXAMPLE 2

Nematic liquid crystal ($\Delta n=0.286$, $\Delta \epsilon=17.3$, $T_{NI}=113°$ C.) of which main constituent is a liquid crystalline tarphenyl compound was mixed with the liquid crystalline difluorostilbene compounds indicated by the chemical formulas (A3), (A5), (A21) and (A51). The mixing ratio of the nematic liquid crystal to the total of the liquid crystalline difluorostilbene compounds was 4:6 by weight. In this way, a nematic liquid crystal mixture which contains liquid crystalline difluorostilbene compounds at 60 wt % was prepared. The chiral agents indicated by the chemical formulas (B3) and (B7) were mixed with each other at the ratio of 62:38 by weight. This chiral agent mixture and a red dye SI-426 (made by Mitsui Chemical Co., Ltd.) were added to the nematic liquid crystal mixture so that the chiral agent mixture and the red dye would be 21.5 wt % and 0.5 wt %, respectively, of the total of the nematic liquid crystal mixture, the chiral agent mixture and the red dye. Thus, a chiral nematic liquid crystal composition which selectively reflects light of around 680 nm was prepared.

Next, a cell of the same structure as that of the experimental example 1 was fabricated by using the same materials by the same method, and the liquid crystal composition was filled in the cell. Also, as in the experimental example 1, a light absorbing layer and a red color filter were provided. Thus, a liquid crystal display was produced.

Figure 8:
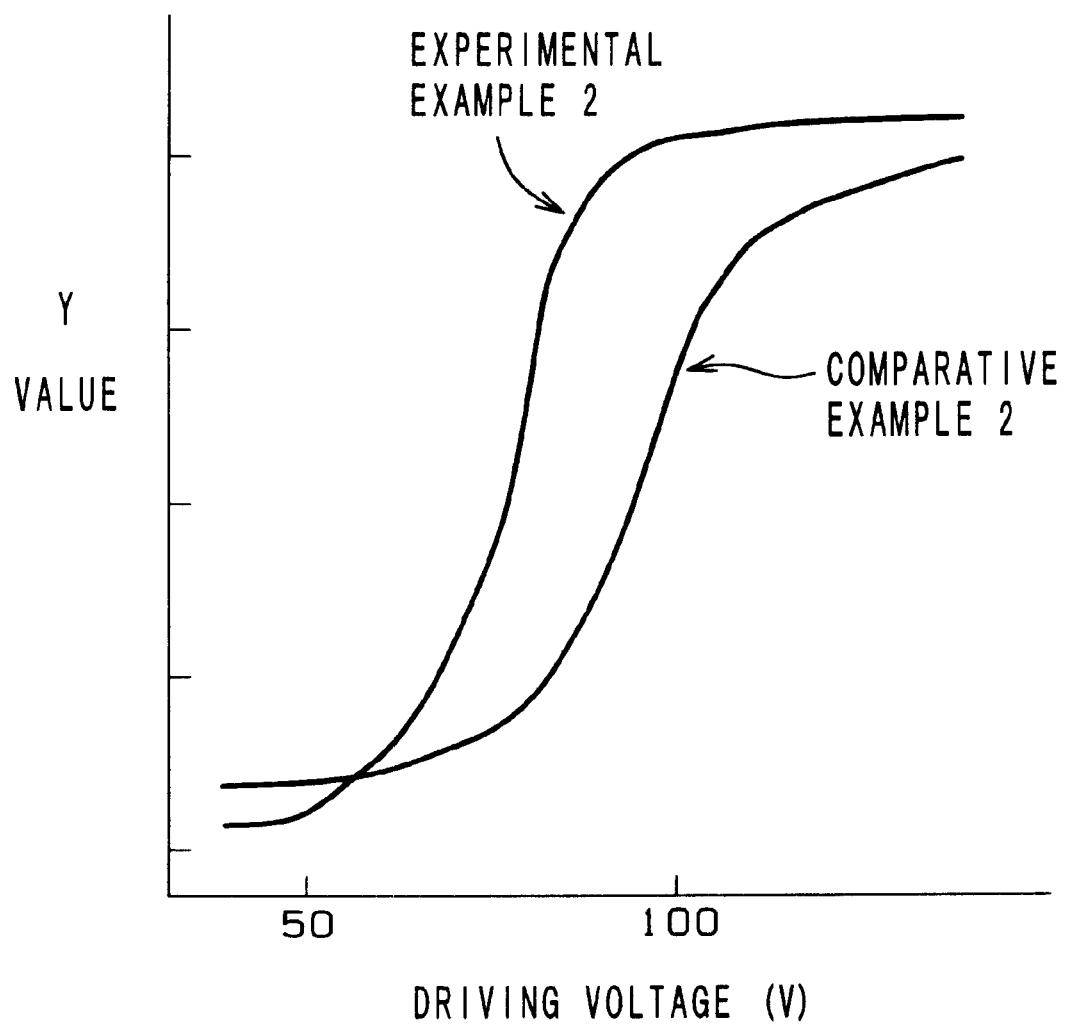
FIG. 8 is a graph which shows characteristics of an experimental example 2 and a comparative example 2 about change in Y value against change in driving voltage.

When a pulse voltage of 50V was applied between the electrodes of this liquid crystal display for 5 msec., the liquid crystal composition became transparent (came to a focal-conic state), and the Y value at that time was 1.06. When a pulse voltage of 75V was applied for 5 msec. thereafter, the liquid crystal composition reflected red light (came to a planar state), and the Y value was 5.00. The contrast was 4.72. The color purity was 76.0%, and the reflectance was 32.4%. The characteristic of this liquid crystal display about change in Y value against change in driving voltage with a pulse width of 1 msec. is shown in FIG. 8.

COMPARATIVE EXAMPLE 2

The chiral agent mixture which was used in the experimental example 2 and the red dye SI426 (made by Mitsui Chemical Co., Ltd.) were added to the nematic liquid crystal of which main constituent is a liquid crystalline tarphenyl compound which was used in the experimental example 2; however, no liquid crystalline difluorostilbene compounds were mixed with the nematic liquid crystal. The chiral agent mixture and the red dye were added so that the chiral agent mixture and the red dye would be 22.8 wt % and 0.5 wt %, respectively, of the total of the nematic liquid crystal, the chiral agent mixture and the red dye. In this way, a chiral nematic liquid crystal composition which selectively reflects light of around 680 nm and which contains no liquid crystalline difluorostilbene compounds was prepared.

Next, a cell of the same structure as that of the experimental example 2 was fabricated by using the same materials by the same method, and the liquid crystal composition was filled in the cell. Also, as in the experimental example 2, a light absorbing layer and a red color filter were provided. Thus, a liquid crystal display was produced.

When a pulse voltage of 60V was applied between the electrodes of this liquid crystal display for 5 msec., the liquid crystal composition became transparent (came to a focal-conic state), and the Y value at that time was 1.18. When a pulse voltage of 90V was applied for 5 msec. thereafter, the liquid crystal composition reflected red light (came to a planar state), and the Y value at that time was 4.8. The contrast was 4.06. The color purity was 78.5%, and the reflectance was 32%. The characteristic of this liquid crystal display about change in Y value against change in driving voltage with a pulse width of 1 msec. is shown in FIG. 8.

EXPERIMENTAL EXAMPLE 3

Nematic liquid crystal ($\Delta n=0.1407$, $\Delta\epsilon=30.8$, $T_{NI}=102°$ C.) of which main constituents are a liquid crystalline ester compound and a liquid crystalline tolane compound was mixed with the liquid crystalline difluorostilbene compound indicated by the chemical formula (A3). The mixing ratio of the nematic liquid crystal to the liquid crystalline difluorostilbene compound was 9:1 by weight. In this way, a nematic liquid crystal mixture which contains a liquid crystalline difluorostilbene compound at 10 wt % was prepared. The chiral agents indicated by the chemical formulas (B6) and (B1) were mixed with each other at the ratio of 1:1 by weight. This chiral agent mixture and the red dye SI-426 (made by Mitsui Chemical Co., Ltd.) were added to the nematic liquid crystal mixture so that the chiral agent mixture and the red dye would be 20.6 wt % and 0.5 wt %, respectively, of the total of the nematic liquid crystal mixture, the chiral agent mixture and the red dye. Thus, a chiral nematic liquid crystal composition which selectively reflects light of around 680 nm was prepared.

Next, a cell of the same structure as that of the experimental example 1 was fabricated by using the same materials by the same method, except using spacer particles with a diameter of 9 $\mu$m and not providing a red color filter on the first substrate. Then, the liquid crystal composition was filled in the cell. Thus, a liquid crystal display was produced.

When a pulse voltage of 35V was applied between the electrodes of this liquid crystal display for 5 msec., the liquid crystal composition became transparent (came to a focal-conic state), and the Y value at that time was 0.97. When a pulse voltage of 65V was applied for 5 msec. thereafter, the liquid crystal composition reflected red light (came to a planar state), and the Y value was 4.62. The contrast was 4.76. The color purity was 57.7%, and the reflectance was 31.5%. Further, for comparison, a liquid crystal composition was prepared in the same way except mixing no difluorostilbene compounds, and a liquid crystal display was produced by use of this liquid crystal composition. The same experiments about this liquid crystal display were carried out. In results, the driving voltage was higher, and the contrast and the response speed were lower.

COMPARATIVE EXAMPLE 3

Nematic liquid crystal ($\Delta n=0.2104$, $\Delta\epsilon=7.4$, $T_{NI}=94°$ C.) of which main constituents are a liquid crystalline tarphenyl compound and a liquid crystalline phenylcyclohexane compound was mixed with the liquid crystalline difluorostilbene compounds indicated by the chemical formulas (A3), (A5), (A21) and (A57). The mixing ratio of the nematic liquid crystal to the total of the liquid crystalline difluorostilbene compounds was 4:6 by weight. In this way, a nematic liquid crystal mixture was prepared. The chiral agents indicated by the chemical formulas (B3) and (B2) were mixed with each other at the ratio of 72:28 by weight. This chiral agent mixture was added to the nematic liquid crystal mixture so that the chiral agent mixture would be 50 wt % of the total of the nematic liquid crystal mixture and the chiral agent mixture. In result, this liquid crystal composition was solidified.

COMPARATIVE EXAMPLE 4

Nematic liquid crystal ($\Delta n=0.1997$, $\Delta\epsilon=7.5$, $T_{NI}=98°$ C.) of which main constituents are a liquid crystalline tolane compound and a liquid crystalline phenylcyclohexane compound was mixed with the liquid crystalline difluorostilbene compounds indicated by the chemical formulas (A3), (A5) and (A51). The mixing ratio of the nematic liquid crystal to the total of the liquid crystalline difluorostilbene compounds was 3:7 by weight. In this way, a nematic liquid crystal mixture was prepared. The chiral agents indicated by the chemical formulas (B3) and (B2) were mixed with each other at the ratio of 72:28 by weight. This chiral agent mixture was added to the nematic liquid crystal mixture so that the chiral agent mixture would be 13.4 wt % of the total of the nematic liquid crystal mixture and the chiral agent mixture. Thus, a chiral nematic liquid crystal composition which selectively reflects light of around 680 nm was prepared.

Next, a cell of the same structure as that of the experimental example 1 was fabricated by using the same materials and by the same method, and the liquid crystal composition was filled in the cell. Also, as in experimental example 1, a light absorbing layer and a red color filter were provided. Thus, a liquid crystal display was produced.

This liquid crystal display was left in a constant temperature bath at 70° C. for 96 hours. Then, the liquid crystal composition turned to selectively reflect light of a different wavelength range, and more specifically, 25 nm longer.

Other Embodiments

The cell may be of a network type which has a meshed composite film composed of a liquid crystal composition and polymer nodules. The cylindrical polymer nodules may be shorter which merely extend to the middle of the gap between the substrates.

As has been described in the above-described examples, experiments were conducted about liquid crystal displays which selectively reflect red light. However, the present invention is also applicable to liquid crystal displays which selectively reflect blue light and liquid crystal displays which selectively reflect green light.

Although the present invention has been described with reference to the accompanying drawings, it is to be noted that various changes and modifications are possible to those who are skilled in the art. Such changes and modifications are to be understood as being within the scope of the present invention.

What is claimed is:

1. A liquid crystal composition comprising:
   a nematic liquid crystal mixture which contains a liquid crystalline difluorostilbene compound; and
   a chiral agent;
   wherein, the liquid crystal composition exhibits a cholesteric phase at room temperature.

2. The liquid crystal composition according to claim 1, wherein the liquid crystalline difluorostilbene compound contained in the nematic liquid crystal mixture is represented by the following formula:

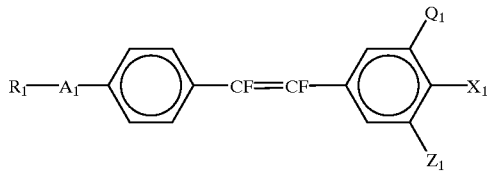

$R_1$: alkyl group with 1 to 10 carbon atoms or alkenyl group with 2 to 10 carbon atoms $A_1$: single bond or 1, 4-cyclohexylene group $X_1$: —F, —Cl or —CN $Q_1$: —F or —H $Z_1$: —F or —H.

3. The liquid crystal composition according to claim 1, wherein the liquid crystalline difluorostilbene compound is 5 weight percent to 60 weight percent of the liquid crystal composition.

4. The liquid crystal composition according to claim 1, wherein the chiral agent is 10 weight percent to 45 weight percent of the liquid crystal composition.

5. The liquid crystal composition according to claim 1, further comprising a coloring agent.

6. A liquid crystal light modulating device comprising:
   a pair of substrates, at least one of which is transparent; and
   a liquid crystal layer which is sandwiched between the substrates, the liquid crystal layer comprising the liquid crystal composition according to claim 1.

7. The liquid crystal light modulating device according to claim 6, wherein the liquid crystal layer has a memory effect.

8. The liquid crystal light modulating device according to claim 6, wherein:
   electrodes are formed on each of the substrates; and
   an insulating layer is provided on the electrodes of at least one of the substrates.

9. The liquid crystal light modulating device according to claim 8, wherein the insulating layer also functions as an alignment controlling layer and/or a color filter.

10. The liquid crystal light modulating device according to claim 6, further comprising polymer nodules which are provided between the substrates.

11. The liquid crystal light modulating device according to claim 6, further comprising a ultraviolet-ray absorbing layer on a surface of one of the substrates which is at a light incidence side.

12. The liquid crystal light modulating device according to claim 6, wherein one of the substrates which is opposite a light incidence side has a light absorbing characteristic or a light absorbing layer.

13. A liquid crystal light modulating device according to claim 6, wherein the liquid crystalline difluorostilbene compound is 10 weight percent to 70 weight percent of the liquid crystal mixture.

14. A liquid crystal light modulating device comprising:
   a pair of substrates, at least one of which is transparent; and
   a liquid crystal layer between the substrates, the liquid crystal layer comprising:
      a liquid crystalline difluorostilbene compound; and
      a chiral agent;
   wherein, the liquid crystal layer exhibits a cholesteric phase at room temperature.

* * * * *